HORIZONTAL SWEEP CIRCUIT FOR CATHODE-RAY TUBE

Filed March 29, 1960

INVENTOR.
WILLIAM H. WOODWORTH
BY
P. H. Firsht
ATTORNEYS.

United States Patent Office 3,041,470

Patented June 26, 1962

3,041,470
HORIZONTAL SWEEP CIRCUIT FOR CATHODE-RAY TUBE

William H. Woodworth, China Lake, Calif., assignor to the United States of America as represented by the Secretary of the Navy Filed Mar. 29, 1960, Ser. No. 18,458
5 Claims. (Cl. 307—88.5)
(Granted under Title 35, U.S. Code (1952), sec. 266)

The invention herein described may be manufactured and used by or for the Government of the United States of America for governmental purposes without the payment of any royalties thereon or therefor.

This invention relates to saw-tooth generators and in particular to a generator having a saw-tooth current waveform for causing a time linear sweep of the electron beam in a cathode ray tube.

Prior methods for providing a saw-tooth current waveform make use of an electrical switch for interrupting the flow of current in an inductive magnetic deflection yoke wherein the switch is driven by a pulse of voltage or current for a duration equal to the retrace period. This requires that apparatus be provided that produces a blanking or retrace pulse and that this pulse coincide with the resonant frequency of the yoke and coupled capacitor. Because of the difficulty in matching the blanking or retrace pulse with the resonant frequency there is bending or folding of the sweep current at the start of the period.

The present invention eliminates the necessity of apparatus that provides a blanking pulse for a duration equal to the retrace period and overcomes the bending or folding of the sweep current. This is accomplished by utilizing the pulse of an oscillator to actuate an electrical switch to start the retrace period and to utilize the voltage of the resonant circuit, which determines the retrace period, to maintain the switch actuated until the retrace period is complete. Thus, the actuated period of the electrical switch must coincide with the retrace period since it is responsive to the voltage of the resonant circuit.

An object of the present invention is to provide a relatively simple and inexpensive circuit for generating a sawtooth waveform for the horizontal sweep of a cathode ray tube.

Another object is to provide a horizontal sweep circuit having a resonant circuit wherein it is not necessary to have separate apparatus providing a blanking or retrace pulse that coincides with the frequency of the resonant circuit.

Still another object is to provide a horizontal sweep circuit having a linear sweep current with no bending or folding at the start of the sweep period.

Still another object is to provide a horizontal sweep circuit which is regenerative and needs only a trigger pulse at the horizontal sweep frequency to cause operation.

Still another object is to provide a horizontal sweep generator the retrace time period being determined only by the resonant frequency of the yoke and coupled capacitor.

Other objects and many of the attendant advantages of this invention will become readily appreciated as the same becomes better understood by reference to the following detailed description when considered in connection with the accompanying drawing wherein.

Figure 1:
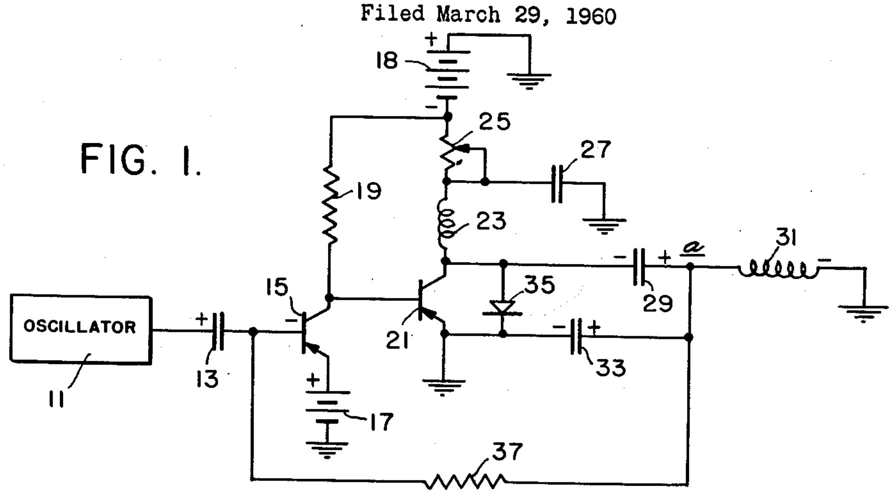
FIG. 1 is a schematic illustration of the cathode ray tube sweep generator of the present invention.

In FIG. 1 is shown an oscillator 11 supplying a trigger voltage through D.C. blocking capacitor 13 to the base of transistor 15. The emitter of transistor 15 is connected through D.C. potential source 17 to ground and the collector is connected to D.C. power source 18 through load resistor 19 to ground. The base of transistor 21 is connected to the collector of transistor 15, the emitter is connected to ground and the collector is connected in series with coil 23, variable resistor 25 and power source 18 to ground. Capacitor 27 is connected between coil 23 and potentiometer 25 to ground in order to bypass any A.C. component away from D.C. power source 18. The collector of transistor 21 is connected in series with capacitor 29 and yoke 31 to ground and the emitter is connected through capacitor 33 to the conductor interconnecting capacitor 29 and yoke 31. Diode 35 is connected across the collector and emitter of transistor 21. The base of transistor 15 is connected through resistor 37 to the conductor interconnecting capacitor 29 and yoke 31.

The following table shows, by way of example, the values of resistance, inductance, capacitance and power which have been used in one embodiment of the circuit of FIG. 1:

| Reference Numeral | Resistance, Inductance, Capacitance or Power | |
|---|---|---|
| 13 | micromicrofarads | 1,500 |
| 17 | volts D.C. | 1.5 |
| 18 | volts D.C. | 12 |
| 19 | ohms | 620 |
| 23 | microhenries | 10 |
| 27 | microfarads | 32 |
| 29 | microfarads | 32 |
| 31 | millihenry | 1 |
| 33 | microfarads | .005 |
| 37 | ohms | 56,000 |

Figure 2:
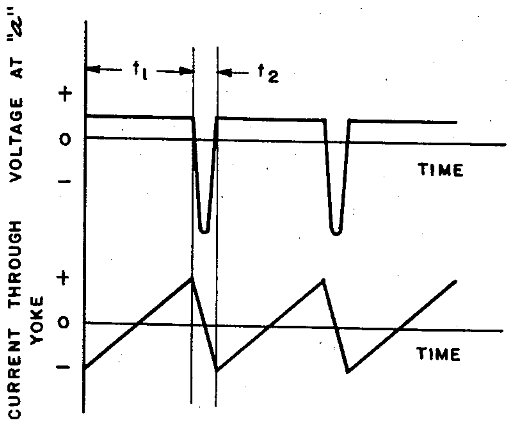
FIG. 2 is a graph showing the yoke current and voltage at point "*a*" of FIG. 1 with respect to time.

The operation of the device shown in FIG. 1 is as follows: Oscillator 11 provides a brief negative pulse which, when applied to the base of transistor 15, renders it conducting. When transistor 15 is conducting, transistor 21 is nonconducting since the positive potential of source 17 is applied to the base thereof. Transistor 15 is nonconducting when the potential at point "*a*" is positive since it is applied to the base thereof through resistor 37. When transistor 15 is nonconducting, transistor 21 is conducting since only the negative potential of power supply 18 is then applied to the base thereof through load resistor 19. From FIG. 1 it can be seen that transistor 21 completes a series circuit including storage capacitor 29 and the paralleled combination of capacitor 33 and yoke 31, and also completes a series circuit including source 18, coil 23 and variable resistor 25. Effective during the retrace period only, capacitor in series with coil 23 and the resistance of potentiometer 25. Capacitor 33 and yoke 31 form a parallel resonant circuit the period of which is twice the desired retrace time. Coil 23 is effective to shock the resonant circuit into ringing when transistor 21 is switched to non-conductive condition at initiation of the retrace period. The ohmic value of variable resistor 25 determines the magnitude of the sweep voltage by establishing the voltage across capacitor 29. The magnitude of the sweep voltage determines the magnitude of the retrace voltage since the volt-second area of the sweep voltage must equal the volt-second area of the retrace voltage in that the net current flow through capacitor 29 must equal zero. Capacitor 29 is of sufficient size enabling it to maintain a positive voltage at point "*a*" during the sweep period, and the potentials are as indicated when transistor 21 is conducting. When transistor 21 is conducting (sweep period), current flows through the loop formed by yoke 31, capacitor 29 and transistor 21, charged capacitor 29 serving as the voltage source. The voltage at point "*a*" and the current through yoke 31 during the sweep period is shown in FIG. 2 as denoted by time period $t_1$. The retrace period, $t_2$ of FIG. 2, is started by the application of a negative pulse to the base of transistor 15. This pulse renders transistor 15 conducting and transistor 21 nonconducting, as previously explained, coil 23 supplies a voltage pulse to the loop formed by yoke 31, coil 23 and capacitor 29, and the resonant circuit is shocked into ringing. The voltage at "*a*" swings through the negative first half-cycle of the resonant ring (retrace period), and when it returns to positive potential (end of retrace period) it renders transistor 15 nonconducting and transistor 21 conducting. The negative voltage at "*a*" is coupled to the base of transistor 15, thus maintaining it conducting and transistor 21 nonconducting during the retrace period. The cycle is then repeated. The resonant circuit (yoke 31 and capacitor 33), is damped against ringing during the sweep period by transistor 21, and looks into a high impedance (coil 23) during the retrace period. The resonant circuit will not swing through the positive half-cycle of the resonant ring, since diode 35 and transistor 21 are rendered conducting as soon as the voltage at point "*a*" becomes positive.

Figure 3:
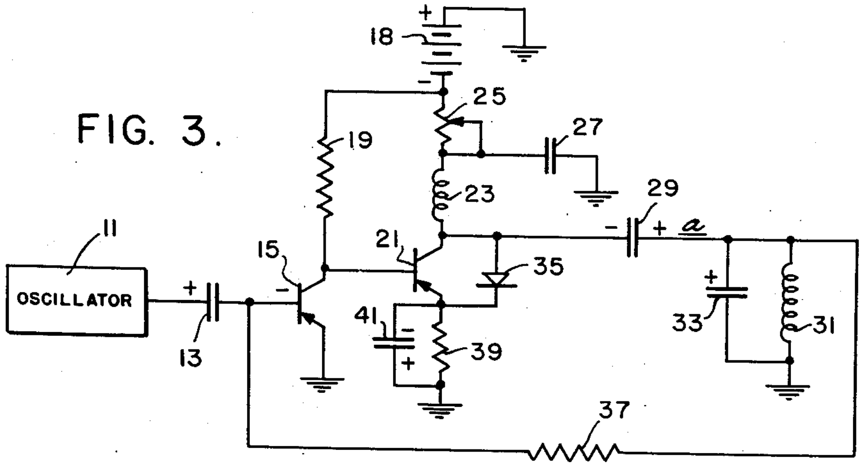
FIG. 3 is a schematic illustration showing a modification of the circuit of FIG. 1.

In FIG. 3 is shown a modification of the sweep circuit of FIG. 1. Potential source 17 of FIG. 1 is replaced by an R.-C. circuit between ground and the emitter of transistor 21. Current flow through transistor 21 charges capacitor 41 as shown and the time constant of resistor 39 and capacitor 41 is such that capacitor 41 will hold its charge through a complete cycle. Therefore, when transistor 15 is rendered conducting, a positive charge is applied to the base of transistor 21 rendering it nonconducting.

Obviously many modifications and variations of the present invention are possible in the light of the above teachings. It is therefore to be understood that within the scope of the appended claims the invention may be practiced otherwise than as specifically described.

What is claimed is:

1. A saw-tooth generator for providing sequential sweep and retrace periods of operation, and responsive to a repetitively applied trigger pulse to terminate a sweep period and initiate a retrace period, comprising: a first circuit branch having normally-closed switch means serially connected with a voltage source and a first inductor, wherein energy is stored in said inductor when said switch means is closed; means responsive to said trigger pulse to open said switch means; a second circuit branch, shunting said switch means and shunting said serially-connected source and first inductor, having a storage capacitor serially connected with a second inductor, wherein said storage capacitor is charged by energy discharge from said first inductor when said switch means opens, and wherein said storage capacitor serves as a source from which current is supplied to said second inductor while said switch means is closed; resonating capacitor means shunting said second inductor and providing therewith an oscillatory circuit, having a half-cycle ring duration corresponding to a preselected retrace period, and wherein ringing is initiated by application of a trigger pulse and occurrence of said energy discharge; means for limiting said ringing to its first half-cycle; and means responsive to said limited ringing for maintaining said switch means in open condition during said first half-cycle; whereby to provide a retrace period of duration set by said limited ringing, followed by a sweep period extending to the next instant of trigger pulse application.

2. A saw-tooth generator for providing sequential sweep and retrace periods of operation, and responsive to a repetitively applied trigger pulse to terminate a sweep period and initiate a retrace period, comprising: normally-closed switch means; a first circuit branch including said switch means and a first inductor wherein energy is stored when said switch means is closed; a second circuit branch including said switch means and a second inductor wherein a current of saw-tooth waveform is developed while said switch means is closed; resonating capacitor means shunting said second inductor and providing therewith an oscillatory circuit having a ringing half-cycle duration corresponding to a preselected retrace period; means responsive to said trigger pulse to open said switch means, effecting energy discharge from said first inductor to said oscillatory circuit, whereby ringing of said oscillatory circuit is initiated; means for limiting said ringing to its first half-cycle; and means responsive to said limited ringing for maintaining said switch means in open condition during said first half-cycle; whereby to provide a retrace period of duration set by said limited ringing, followed by a sweep period extending to the next instant of trigger pulse application.

3. A saw-tooth generator for providing sequential sweep and retrace periods of operation, and responsive to a repetitively applied trigger pulse to terminate a sweep period and initiate a retrace period, comprising: normally-closed switch means; a first circuit branch including in serial connection said switch means, a first voltage source and a first inductor wherein energy is stored when said switch means is closed; a second circuit branch including in serial connection said switch means, a second voltage source and a second inductor wherein a current of saw-tooth waveform is developed while said switch means is closed; resonating capacitor means shunting said second inductor and providing therewith an oscillatory circuit having a ringing half-cycle duration corresponding to a preselected retrace period; means responsive to said trigger pulse to open said switch means, effecting energy discharge from said first inductor to said oscillatory circuit, whereby ringing of said oscillatory circuit is initiated; means for limiting said ringing to its first half-cycle; and means responsive to said limited ringing for maintaining said switch means in open condition during said first half-cycle; whereby to provide a retrace period of duration set by said limited ringing, followed by a sweep period extending to the next instant of trigger pulse application.

4. A saw-tooth generator for providing sequential sweep and retrace periods of operation, and responsive to a repetitively applied trigger pulse to terminate a sweep period and initiate a retrace period, comprising: normally-closed switch means; a first circuit branch including in serial connection said switch means, a voltage source and a first inductor wherein energy is stored when said switch means is closed; a second circuit branch including in serial connection said switch means, a storage capacitor and a second inductor wherein a current of saw-tooth waveform is developed while said switch means is closed; resonating capacitor means shunting said second inductor and providing therewith an oscillatory circuit having a ringing half-cycle duration corresponding to a preselected retrace period; means responsive to said trigger pulse to open said switch means, effecting energy discharge from said first inductor to said oscillatory circuit, whereby ringing of said oscillatory circuit is initiated; diode means shunting said switch means for limiting said ringing to its first half-cycle; and means responsive to said limited ringing for maintaining said switch means in open condition during said first half-cycle; whereby to provide a retrace period of duration set by said limited ringing, followed by a sweep period extending to the next instant of trigger pulse application.

5. A saw-tooth generator for providing sequential sweep and retrace periods of operation, and responsive to a repetitively applied trigger pulse to terminate a sweep period and initiate a retrace period, comprising: a switching-transistor normally biased to a conductive condition; a first circuit branch including said switching-transistor and a first inductor wherein energy is stored when said switching-transistor is in conductive condition; a second circuit branch including said switching-transistor and a second inductor wherein a current of saw-tooth waveform is developed while said switching-transistor is in conductive condition; resonating capacitor means shunting said second inductor and providing therewith an oscillatory circuit having a ringing half-cycle duration corresponding to a preselected retrace period; means responsive to said trigger pulse to render said switching-transistor non-conductive, effecting energy discharge from said first inductor to said oscillatory circuit, whereby ringing of said oscillatory circuit is initiated; means for limiting said ringing to its first half-cycle; and means responsive to said limited ringing for maintaining said switching-transistor in non-conductive condition during said first half-cycle; whereby to provide a retrace period of duration set by said limited ringing, followed by a sweep period extending to the next instant of trigger pulse application.

References Cited in the file of this patent

UNITED STATES PATENTS 2,939,040 Isabeau ---------------- May 31, 1960